US008405706B2

(12) United States Patent (10) Patent No.: US 8,405,706 B2
Zhang et al. (45) Date of Patent: Mar. 26, 2013

(54) VISUAL FEEDBACK FOR NATURAL HEAD POSITIONING

(75) Inventors: Zhengyou Zhang, Bellevue, WA (US); Christian Huitema, Clyde Hill, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 12/336,534

(22) Filed: Dec. 17, 2008

(65) Prior Publication Data

US 2010/0149310 A1 Jun. 17, 2010

(51) Int. Cl.
H04N 7/14 (2006.01)
(52) U.S. Cl. ............... 348/14.16; 348/14.08; 348/14.12; 348/14.07
(58) Field of Classification Search ..... 348/14.01–14.16
See application file for complete search history.

(56) References Cited

U.S. PATENT DOCUMENTS

| 5,500,671 | A | 3/1996 | Andersson et al. |
| 5,786,846 | A * | 7/1998 | Hiroaki ........................ 348/14.16 |
| 5,933,151 | A | 8/1999 | Jayant et al. |
| 6,806,898 | B1 | 10/2004 | Toyama et al. |
| 6,879,879 | B2 | 4/2005 | Jouppi et al. |
| 7,231,099 | B1 | 6/2007 | Basso et al. |
| 7,272,243 | B2 | 9/2007 | Toyama |
| 2003/0218672 | A1 | 11/2003 | Zhang et al. |
| 2004/0104935 | A1 | 6/2004 | Williamson et al. |

OTHER PUBLICATIONS

Jouppi, et al., "Telepresence Systems with Automatic Preservation of User Head Height, Local Rotation, and Remote Translation", retrieved at <<http://ieeexplore.ieee.org/iel5/10495/33250/01570097.pdf>>, Proceedings of the 2005 IEEE, International Conference on Robotics and Automation, Apr. 2005, pp. 62-68.
Gemmell, et al., "Gaze Awareness for Video-Conferencing: A Software Approach", retrieved at <<http://research.microsoft.com/~JGemmell/pubs/StareMasterIEEEmm.doc>>, pp. 13.
Barakonyi, et al., "Cascading Hand and Eye Movement for Augmented Reality Video conferencing", retrieved at <<http://www.icg.tu-graz.ac.at/pub/pdf/barakonyihandeyemovement07>>, pp. 8.
Schreer, et al., "Virtue—The Step Towards Immersive Telepresence in Virtual Video-Conference Systems", retrieved at <<http://ip.hhi.de/imedia_G3/assets/pdfs/eBusiness00.pdf>>, pp. 7.

* cited by examiner

Primary Examiner — Melur Ramakrishnaiah (57) ABSTRACT

A videoconferencing conferee may be provided with feedback on his or her location relative a local video camera by altering how remote videoconference video is displayed on a local videoconference display viewed by the conferee. The conferee's location may be tracked and the displayed remote video may be altered in accordance to the changing location of the conferee. The remote video may appear to move in directions mirroring movement of the conferee. This effect may be achieved by modeling the remote video as offset and behind a virtual portal corresponding to the display. The remote video may be displayed according to a view of the remote video through the virtual portal. As the conferee's position changes, the view through the portal changes, and the remote video changes accordingly.

19 Claims, 11 Drawing Sheets

RELATED ART

VISUAL FEEDBACK FOR NATURAL HEAD POSITIONING

BACKGROUND

Figure 1:
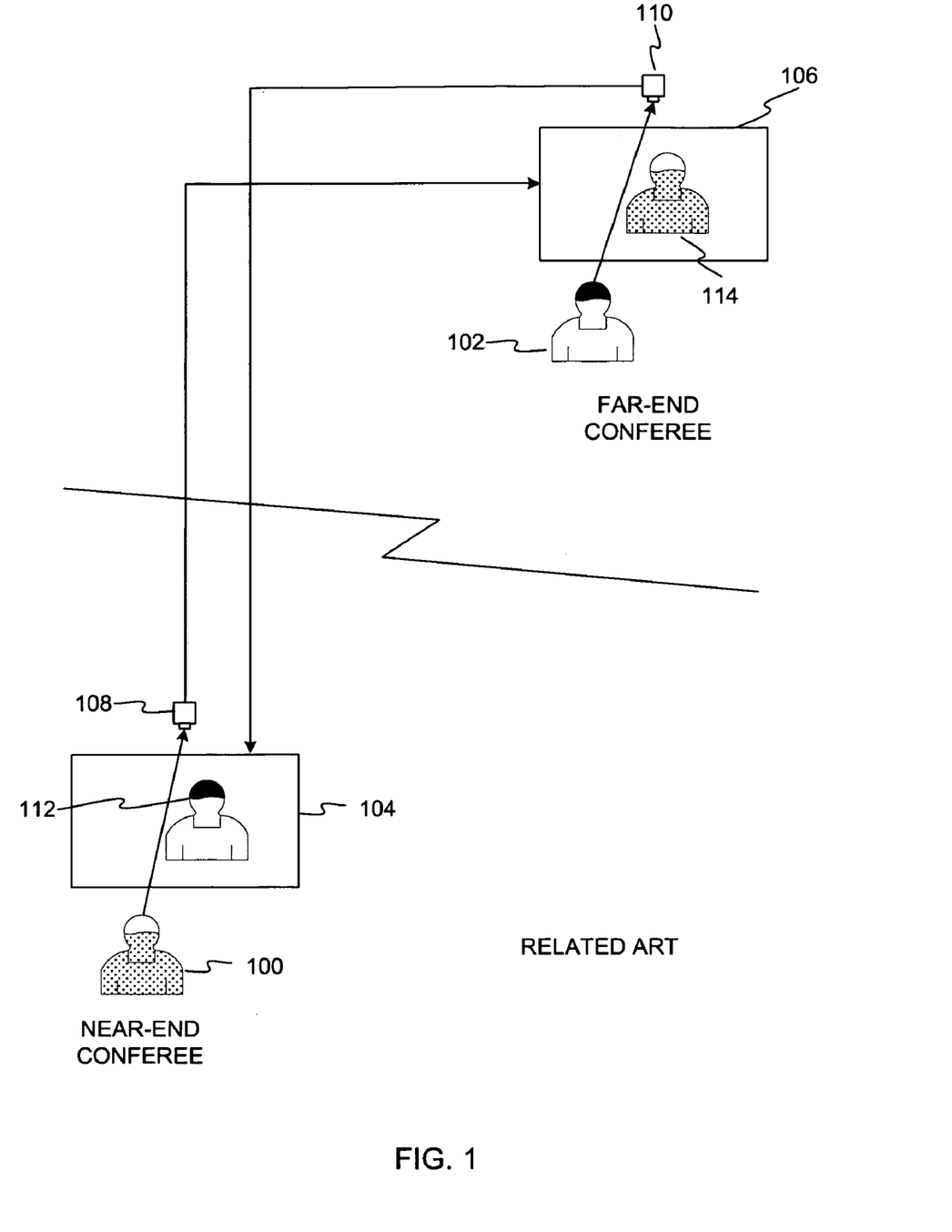
FIG. 1 shows a simple videoconference system where a near-end conferee or person is communicating with a far-end person or conferee.

FIG. 1 shows a simple videoconference system where a near-end conferee or person 100 is communicating with a far-end person or conferee 102. Each person uses a video conference terminal that may include a display 104, 106 and a video camera 108, 110. Each person 100, 102 sees on their display 104, 106 an image 112, 114 of the other person 102, 100 in video provided by the other videoconference terminal's camera 108, 110.

In practice, videoconferencing systems are constructed with a diverse range of hardware components, software features, communication interfaces, and protocols. Videoconference terminals may have multiple cameras or displays, varying means of communication, and so on. Some terminals are specialized hardware devices with a dedicated camera, display, microphone, circuitry, and telephonic communication equipment. Other terminals are general purpose computers equipped with peripheral cameras, displays, etc. Others may be a hybrid of the two. While configurations vary, the basic design of most videoconference system involves the transmitted exchange and display of video signals between distanced conferees, with each conferee seeing real-time video of the other conferee.

Figure 2:
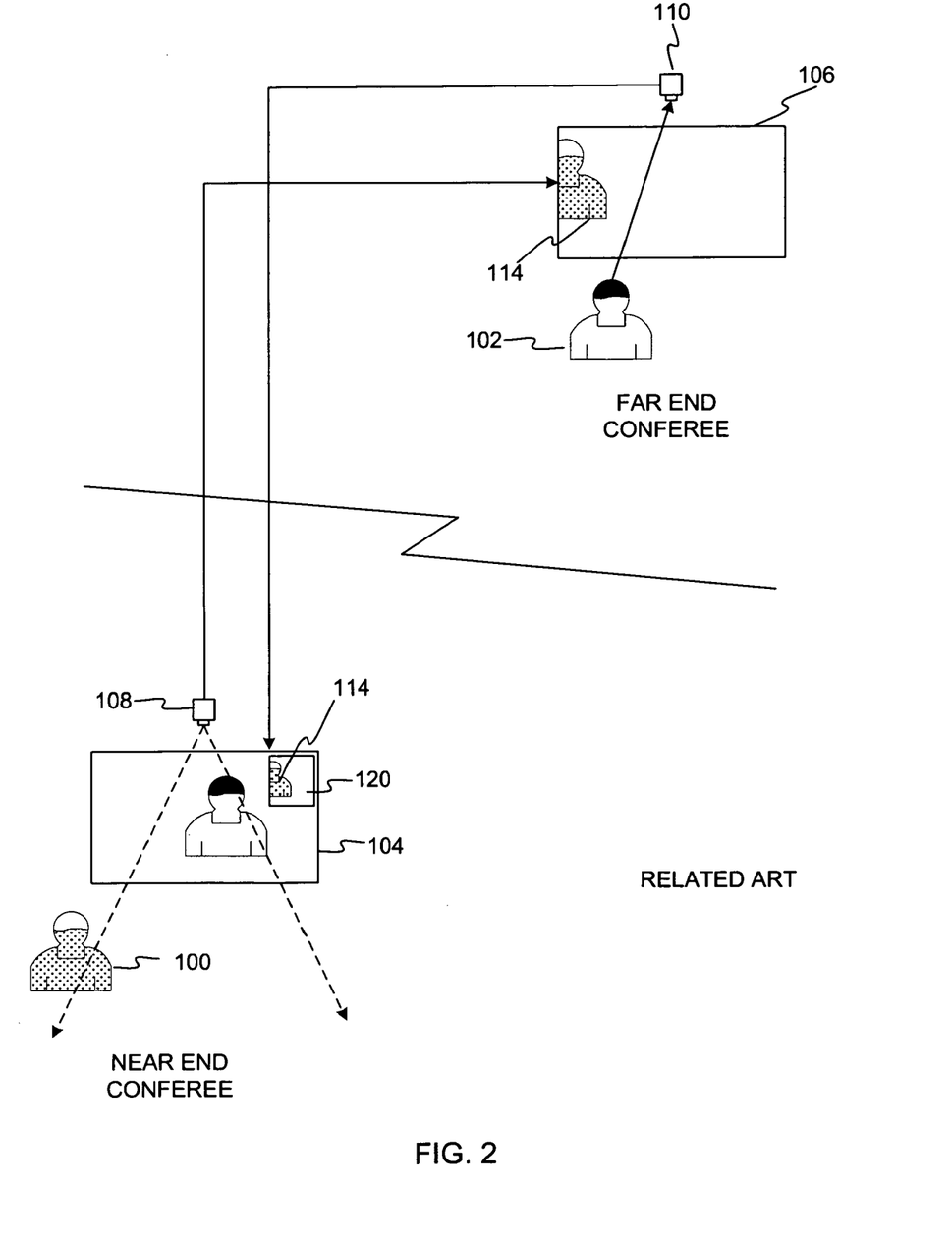
FIG. 2 shows a video conference system where the near-end person moves outside the field of view of the near-end camera.

FIG. 2 shows a video conference system where the near-end person 100 moves outside the field of view of the near-end camera 108. One problem with videoconferencing systems, in particular when used for one-on-one communication, is that as the near-end person 100, for example, moves around the near-end camera 108 of the near-end terminal, the person may move to the outer areas of the camera's field of view (the area between the dashed arrows originating at camera 108). The far-end person 102 will see on their display 106 video where the image 114 of the near-end person 100 is fully or partly out of view.

To solve this problem, videoconferencing systems have locally displayed the locally captured video in a separate local window 120, thus enabling a conferee to see how he or she is positioned within the camera's field of view and giving an idea of what the remote conferee is seeing. However, this approach may produce an unsatisfactory user experience.

Techniques discussed below relate to providing to a conferee visual feedback that changes to reflect the conferee's changing position relative to the conferee's local camera or videoconference terminal.

SUMMARY

The following summary is included only to introduce some concepts discussed in the Detailed Description below. This summary is not comprehensive and is not intended to delineate the scope of the claimed subject matter, which is set forth by the claims presented at the end.

A videoconferencing conferee may be provided with feedback on his or her location relative to a local video camera by altering how remote videoconference video is displayed on a local videoconference display viewed by the conferee. The conferee's location may be tracked and the displayed remote video may be altered in accordance to the changing location of the conferee. The remote video may appear to move in directions mirroring movement of the conferee. This effect may be achieved by modeling the remote video as offset and behind a virtual portal corresponding to the display. The remote video may be displayed according to a view of the remote video through the virtual portal. As the conferee's position changes, the view through the portal changes, and the remote video changes accordingly.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Techniques discussed below relate to providing to a conferee visual feedback that changes to reflect the conferee's changing position relative to the person's local camera or videoconference terminal. Different forms of feedback used previously, for example displaying locally captured video in a local window 120, distract the local conferee from the conversation with the remote conferee. To see how he or she is positioned relative to the camera, the local conferee must glance away from video image of the other conferee. Other forms of feedback have proven similarly intrusive and distracting.

The following description will begin with explanation of a conceptual way to render video that may result in a realistic and unobtrusive form of feedback. The concept is to render video as though it were being shown behind a window or portal, the portal corresponding to the display on which the video will be displayed on. This will be followed by description of algorithms that may be used to implement embodiments of a videoconference system that provide feedback in such a manner. Finally, modeling techniques and various techniques for displaying video will be explained.

View-Through-Window Concept

Figure 3:
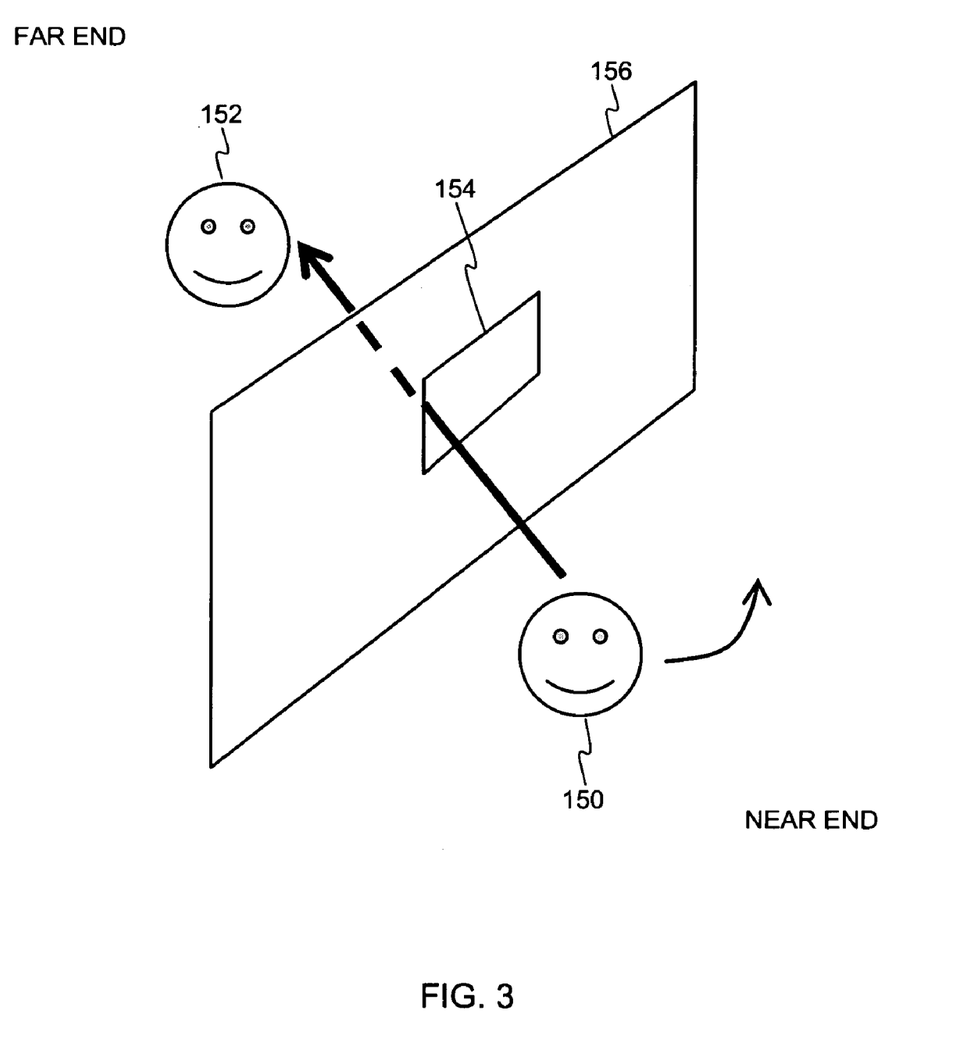
FIG. 3 shows a scenario of two persons viewing each other through a portal or window in a wall.

FIG. 3 shows a scenario of two persons 150, 152 viewing each other through a portal or window 154 in a wall 156.

Naturally, if the near-end person 150 moves, the near-end person's 150 perspective of the far-end person 152 will change; the line of sight to the far-end person will shift. The far-end person 152, being behind the window 154 and wall 156, will appear to move within the frame of the window 154. If the near-end person 150 moves far enough away from the normal of the window 154, the far-end person 152 will start to be obscured by the wall around the window 154. The general concept of viewing an object at a depth behind a portal can be applied to videoconferencing. While precise imitation of such portal viewing is possible, visual effects approximating or roughly imitating the natural phenomena may be achieved as described herein.

Figure 4:
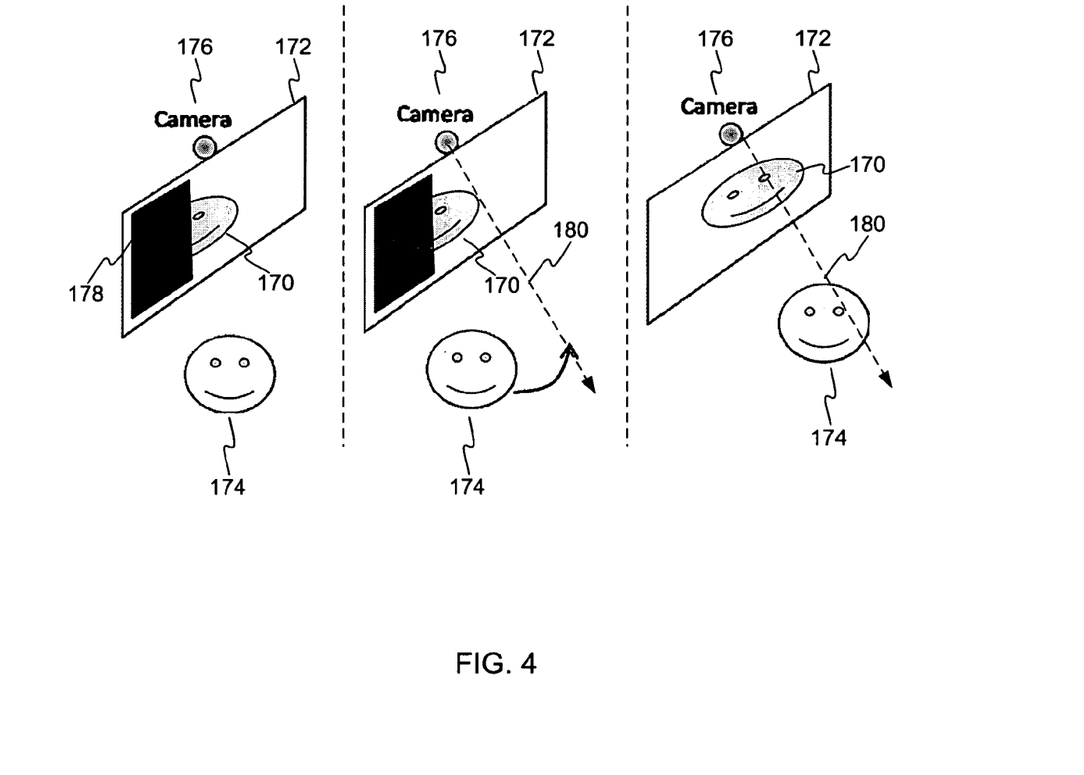
FIG. 4 shows how remote video of a remote conferee may be displayed on a local videoconferencing display to provide feedback to a local conferee about his or her position in a local camera's field of view.

FIG. 4 shows how remote video 170 of a remote conferee may be displayed on a local videoconferencing display 172 to provide feedback to a local conferee 174 about his or her position in a local camera's 176 field of view. In the first scene (left), the local conferee 174 is at the edge of the camera's 176 field of view. A problem exists in the video (from camera 176) seen at the remote terminal, where the image of the conferee 174 is partly or fully out of view. Assuming for the moment that the conferee's 174 position relative to the camera 176 is tracked, when the conferee's 174 position is at the edge of the camera's 176 field of view, in similar fashion to an object partially seen through a physical window, the remote video 170 is partially clipped, occluded, or otherwise given the effect of not being displayed. In this example, the effect is provided by a virtual wall 178.

In the middle scene of FIG. 3, the local conferee 174 notices that the remote video 170 is falling off to the left, and to compensate, the conferee 174 decides to move in a direction opposite the edge of the remote video 170 that is cut off in order to see the remote person fully in a similar fashion to that of seeing through a physical window. In this example, the local conferee 174 moves to the right, which is toward the center 180 of the camera's 176 field of view.

In the right-hand scene of FIG. 3, the local videoconferencing terminal, again making use of the tracked location of the local conferee 174, displays the remote video 170 in accordance with the new position of the local conferee 174, and the remote video 170 is displayed without being "obstructed" by the virtual wall 178. The local conferee, now near the center 180 of the camera 176's field of view, is seen centered at the remote videoconferencing terminal. By causing the remote video 170 to appear to move with the conferee 174, the conferee 174 is able to naturally stay in sight of the local camera 176. Furthermore, not only is cut off avoided, but the conferee 174 is naturally attracted not just away from an edge of the field but toward the center 180 of the camera's field of view, which can increase the sense of eye contact between the remote and local conferee 174. As will be described, other techniques beside the virtual wall 178 may be used to provide similar effect.

Embodiments for Providing Feedback

Figure 5:
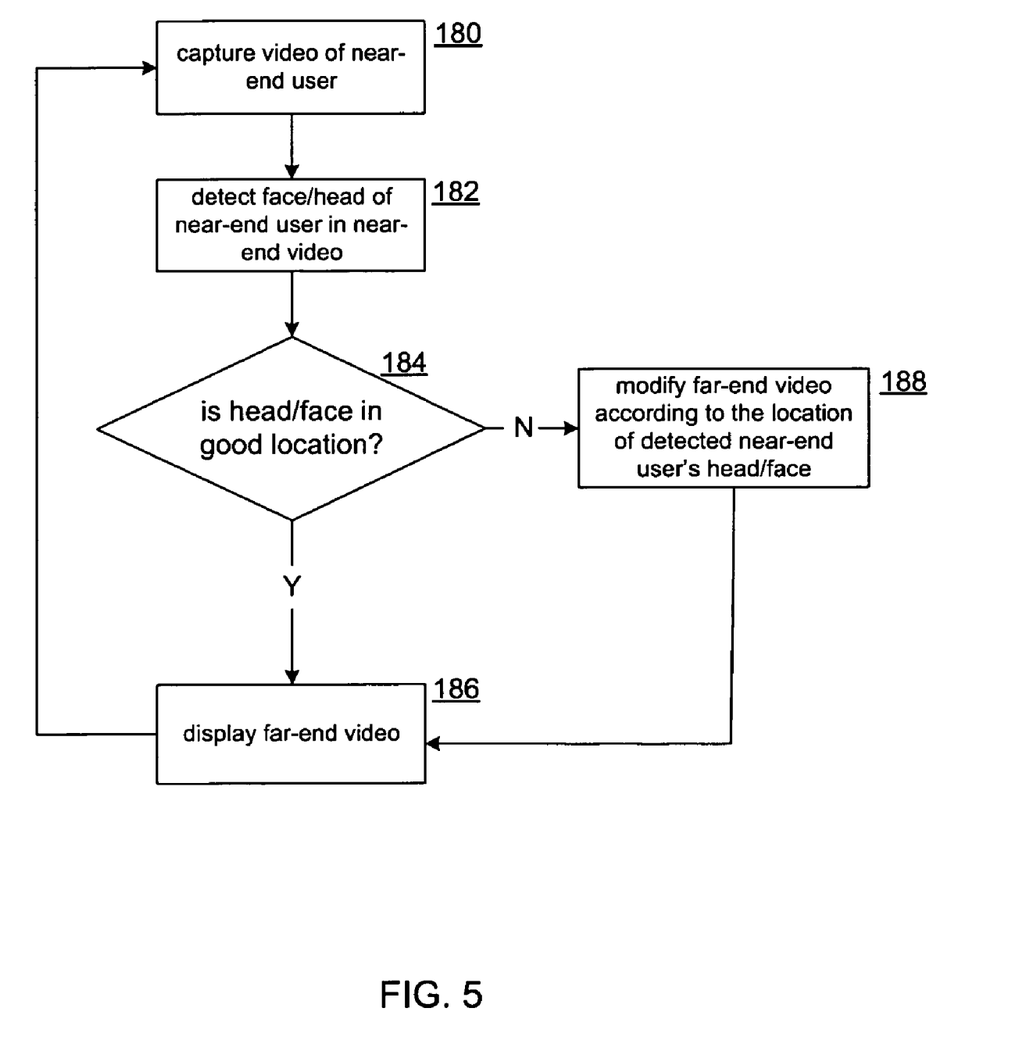
FIG. 5 shows a process for analyzing near-end video to display remote video in a way that provides feedback to a near-end conferee about the near-end conferee's position.

FIG. 5 shows a process for analyzing near-end video to display remote video in a way that provides feedback to a near-end conferee about the near-end conferee's position. The process of FIG. 5 may be performed by a videoconferencing device. Video of the near-end conferee is captured 180. The video is both provided to a far-end videoconferencing device and is analyzed by the near-end terminal to detect 182 the head and/or face of the person in the near-end video. Known algorithms may be used for head and/or face detection and tracking. In the alternative, algorithms to detect the body of near-end conferee may be used. The location and optionally the size of the conferee in frames of the near-end video can be used to estimate the conferee's real-world position in two or three dimensions. Yet in another alternative, a 3D range camera or a combination of range and video cameras may be used to determine the conferee's real-world position.

If it is determined 184 that the conferee is in a good location, i.e. near the center, then the remote video is displayed 186. If the conferee is not in a good position, then the display of the remote (far-end) video is modified 188 according to the location of the conferee. Different techniques for modifying 188 the remote video will be described below with reference to FIG. 10.

The location of the detected 182 image of the conferee within frames of video can be used to estimate the conferee's two-dimensional position relative to the camera's center of view (i.e., how far above or below the camera's center of view, and how far to the left or right of the camera's center of view). While the two-dimensional position of the conferee is sufficient to modify 188 the remote video to match the conferee's position, if the conferee's distance from the camera is also estimated, then a more realistic effect can be achieved. The remote video may be zoomed out as the conferee moves back from the camera. Also, the distance may be used to help estimate the degree of shift and or occlusion given to the displayed remote video.

Figure 6:
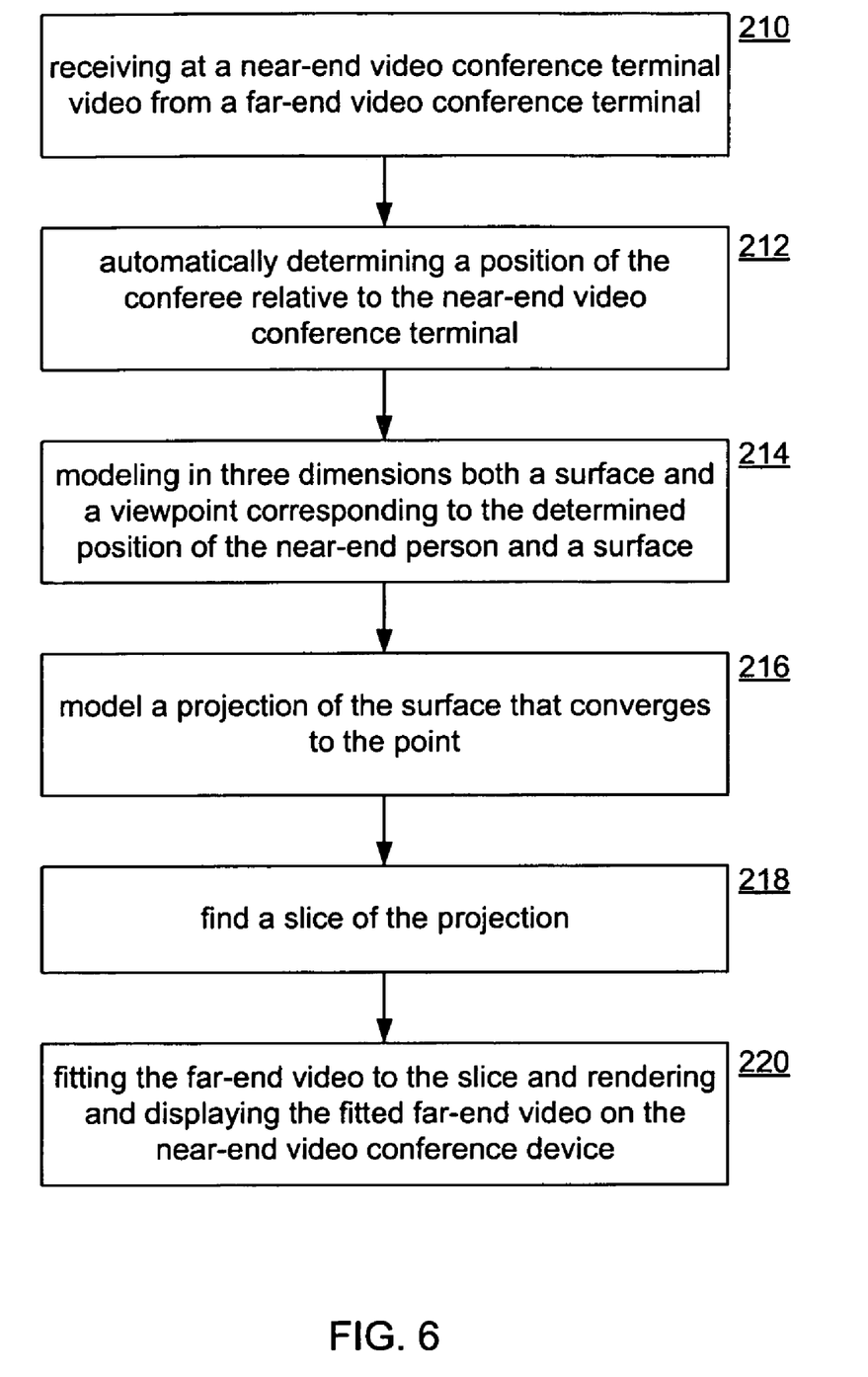
FIG. 6 shows another process for providing feedback by modifying how far-end video is displayed.

FIG. 6 shows another process for providing feedback by modifying how far-end video is displayed. A near-end videoconferencing terminal receives 210 video from a far-end videoconferencing terminal. The position of a conferee relative to the near-end video conference terminal (or its camera, depending on how close they are) is automatically determined 212. The position may be determined 212 from locally captured video. The position or location of the conferee may be determined by any means. For example, some videoconference terminals have a microphone array whose signals can be used to locate a person's voice. Reflector based systems may be used. Also, depth-sensing cameras may be used to help determine a conferee's position.

The position of the conferee is used to model 214 a scene for the purpose of obtaining a rendering of the far-end video. Referring to the window/portal concept, a surface modeled in the scene corresponds to a subject being viewed on the other side of a window, and a viewpoint is modeled in the scene to correspond to or represent the determined 212 position of the conferee. The surface may be thought of as a virtual display displaying the remote video. As the conferee's location changes, the position of the viewpoint in the model changes. A projection from the surface to the viewpoint is modeled 216 (analogous to a person's view of the object behind the window). A slice of the projection is found 218, which is analogous to the window/wall through which a person is looking. As will be appreciated with the explanation of FIG. 7, the slice or intersection indicates which part of the modeled surface is "obstructed" from line of sight from the viewpoint to the surface. The steps of FIG. 6 may be repeated in varying order and frequency in a continuous fashion. As used herein, "continuous" means performed in repetition sufficient to achieve a smooth effect, for example, sampling and adjusting 10 times per second.

Figure 7:
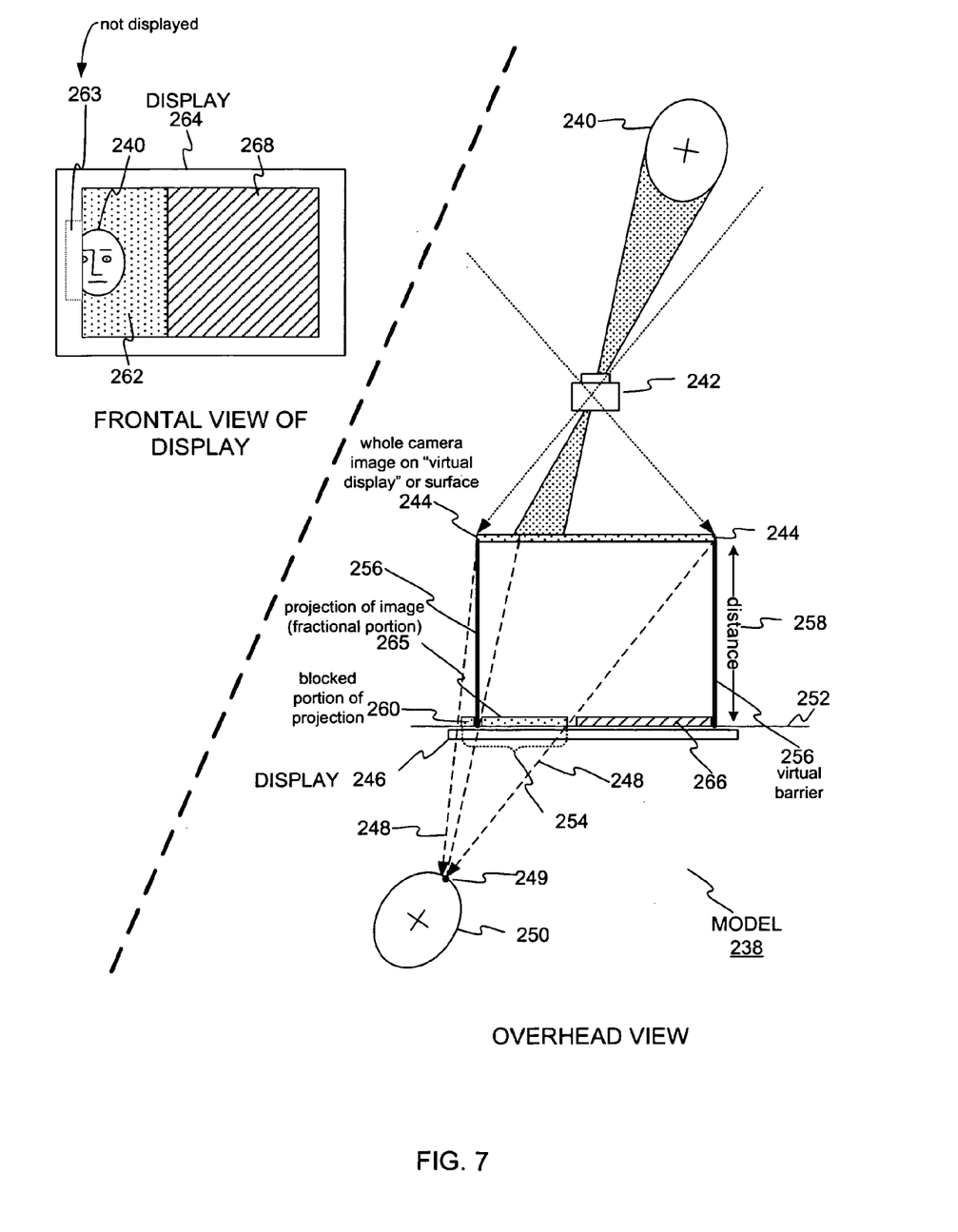
FIG. 7 shows how a model can be used to connect remote video to the location of a local conferee.

FIG. 7 shows how a model 238 can be used to connect remote video to the location of a local conferee. The following explanation will proceed from the upper right of the figure, to the lower portion, and then to the upper left. As in a typical videoconference, a remote conferee 240 is before the camera 242 of a videoconference terminal. The camera 242 captures video and the video is transmitted via a communication medium or network to another videoconference terminal where it is to be displayed. The model 238 is a mathematical model that may be used to determine how to render the remote video.

First, the model 238 includes a surface 244. In the figure, this is the bar pointed to by the rays from camera 242. The example surface 244 is a sectional view from above. The surface 244 may be a bounded surface (preferably planar, but not required) of any shape, for example an oval, a square, etc. The surface 244 may be thought of as displaying the remote video on the surface 244, however, rendering the remote video on the surface 244 is not necessary; the geometry and the modeling of the video on the surface are of interest. In a preferred embodiment, the surface 244 is a rectangle dimensioned according to the dimensions of the remote video or the dimensions of an area within which it will be displayed on an actual display 246.

The model includes a projection (the area between arrows 248) of the surface 244 to the modeled location 249 of the conferee 250. The modeled point or location 249 is tied to the determined location of the conferee 250. Therefore, as the real and modeled location 249 of the conferee 250 change, the projection, while staying anchored to the surface 244, changes to remain convergent to the changing location 249 (which moves to mirror movement of the conferee 250).

The model 238 also includes a plane 252 (seen from above in FIG. 7). The plane 252 may be substantially parallel to the surface 244. The projection has an intersection 254 with the plane 252. As the location 249 and projection move, so does the intersection. The intersection 254 may also grow and shrink depending on the angle of the projection.

The model further includes virtual barriers 256, which may at times lie in the path of the projection. In another embodiment, the virtual barriers 256 may be the plane 252 less the area between barriers 256 (thus forming a virtual portal or virtual window). For example, see barriers 282 in FIG. 8.

The model's 238 surface 244 is some depth or distance 258 from a virtual portal in plane 252 (bounded by virtual barriers 256). As the projection and location 249 move (per the conferee's 250 location), so does the intersection 254. The intersection 254 may be mapped to a graphical area 262 of the display 264 of the conferee's 250 videoconferencing terminal. In one embodiment, the remote video is fitted to area 262 and area 262 is sized/positioned according to intersection 254. The area 262 displays the remote video as though it were projected from surface 244 (behind the display 264) and out to the conferee 250. This may be thought of as displaying the remote video at the back of a box (defined by virtual barriers 256 and surface 244), and the conferee views the remote video through an opening in the box (the portal in plane 252 between the barriers 256). Depending on the location 249, a portion 260 of the intersection 254 may be fully or partly (as in FIG. 7) blocked from view by a virtual barrier 256 (the sides of the "box"). As seen in FIG. 7, the intersection 254 has portion 260 out of view, i.e., not "visible" through the virtual portal. In correspondence, the area 262 shows part 263 of the remote video cut off (part 263 corresponding to portion 260 of the intersection 254). The fractional portion 265 of the intersection 254 that is not obstructed determines the portion of remote video that is displayed on display 264. In one embodiment, when an edge of the intersection 254 moves away from a virtual barrier 256, a gap 266 between the two may be represented by a graphical wall 268 or other non-video image data that grows and shrinks to fill the gap.

While the model 238 involves a number of geometric components, such components are not needed to actually render remote video. Aspects of the model 238 may be implicitly present in simple formulas for computing portions, proportions, and/or locations of the displayed remote video. For example, distance 258 and surface 244 may be fixed. Thus, the intersection 254 can be estimated directly from the location 249, for example by a combination of trigonometric and/or linear formulas.

If the conferee's 250 location is determined in three dimensions (including distance from the camera), then the location 249 may also vary in distance from plane 252. Thus, the intersection (and consequently, the display of remote video, e.g. area 262) may shrink and grow, providing a realistic effect.

Figure 8:
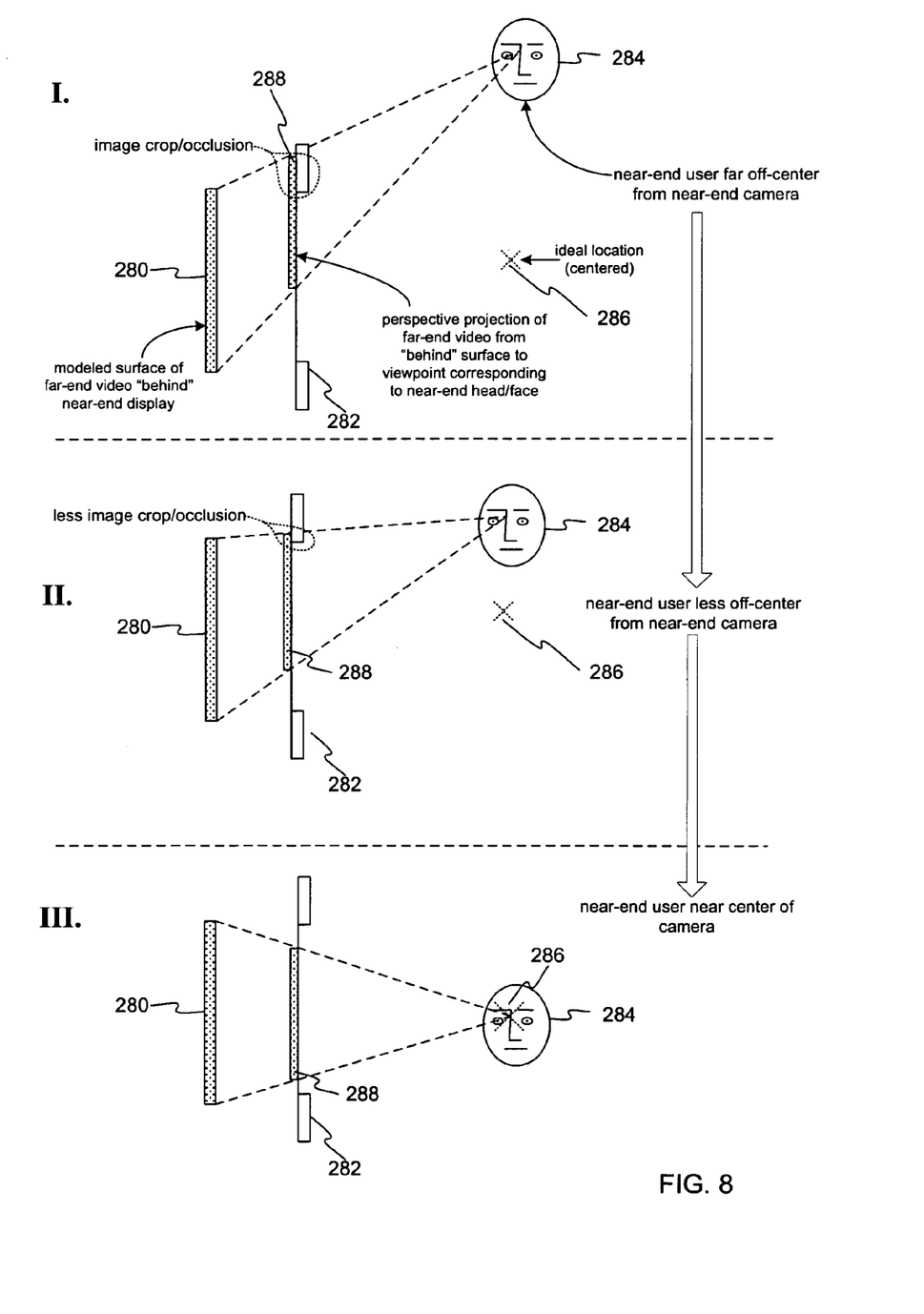
FIG. 8 shows video images (or surfaces) modeled to have depth "behind" a virtual portal.

FIG. 8 shows video images 280 (or surfaces) modeled to have depth "behind" a virtual portal 282. A conferee 284 is before a camera (not shown). There is an ideal location 286 for eye contact and centering. In scene I, the conferee 284 is off-center and a projected view 288 of the video image 280 is partially obscured by the virtual portal 282. In correspondence with the projected view 288, a displayed rendering of the remote video image 280 shows the remote video as off-center. In scene II, the conferee 284, seeing off-center remote video, moves toward the ideal location 286. The location change is detected, and the projected view 288 moves/changes accordingly and becomes less obstructed. In scene III, the conferee 284 has moved to the ideal location 286 and the projected view 288 and corresponding rendered remote video are substantially centered.

Figure 9:
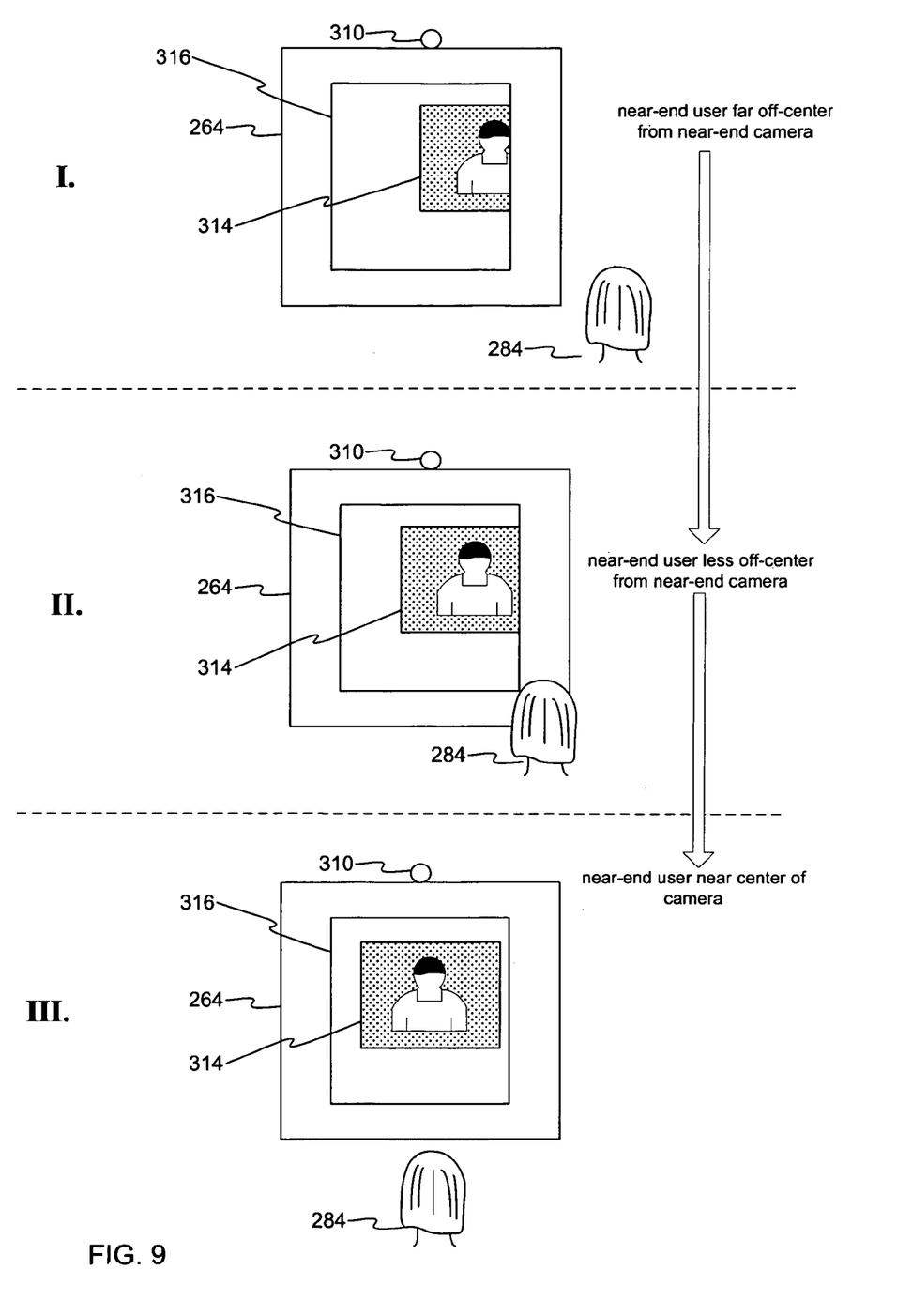
FIG. 9 shows displays of remote video rendered according to the projected views of FIG. 8.

FIG. 9 shows displays of remote video rendered according to the projected views 288 of FIG. 8. A camera 310 is located near a display 312. The remote video is shown in a dynamically changing/moving area 314 within a window or frame 316. In scene I, the area 314 is partially outside the window. In scene II, more of the area 314 (remote video) is displayed. In scene III, the area 314 is substantially centered on the display 264, indicating to the conferee 284 that the remote conferee also sees the conferee 284 centered. In one embodiment, as the conferee 824 moves toward or away from the camera 310, the area 314 may grow or shrink accordingly. In another embodiment, the area 314 may widen and contract as the conferee moves away from and toward, respectively, the camera's center.

Figure 10:
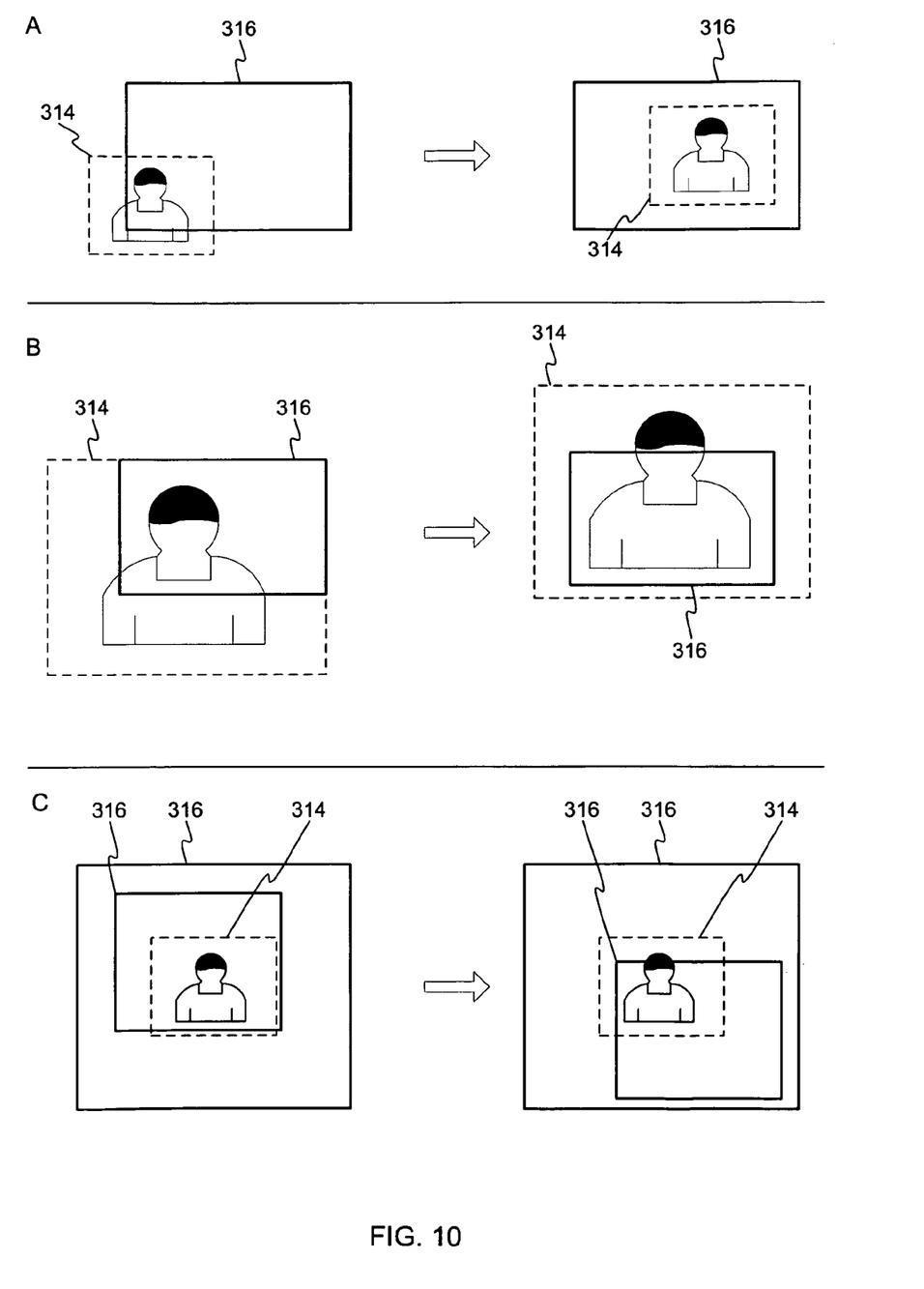
FIG. 10 shows different feedback techniques.

It should be noted that a number of techniques may be used to provide visual feedback to the conferee 284 about his or her position relative to the camera 310. FIG. 10 shows different feedback techniques. With technique A, the displayed area 314 of remote video simply moves about and optionally resizes within fixed window or frame 316; gaps are filled with non-video data. Technique B involves the same technique as A, but the area 314 is substantially larger than the window or frame 316 and gaps are avoided or minimal. With technique C, the window or frame 316 moves and optionally re-dimensions about the area 314 of displayed remote video. The window or frame 316 acts like an occluding frame, blocking the area 314 where the two overlap. Other techniques may be used. A combination of techniques A, B, and C may be used. The area 314 of remote video may be displayed as a window and virtual barriers may be triggered on or off for display in the window when the conferee reaches a threshold angular distance from the center of the camera (see the discussion of FIGS. 4 and 5). Such a distance may be 5 degrees, roughly the view offset at which two people lose the perception of eye contact. As can be seen, relative or apparent movement and/or re-dimensioning of the remote video area 314 may be achieved in a number of ways.

Figure 11:
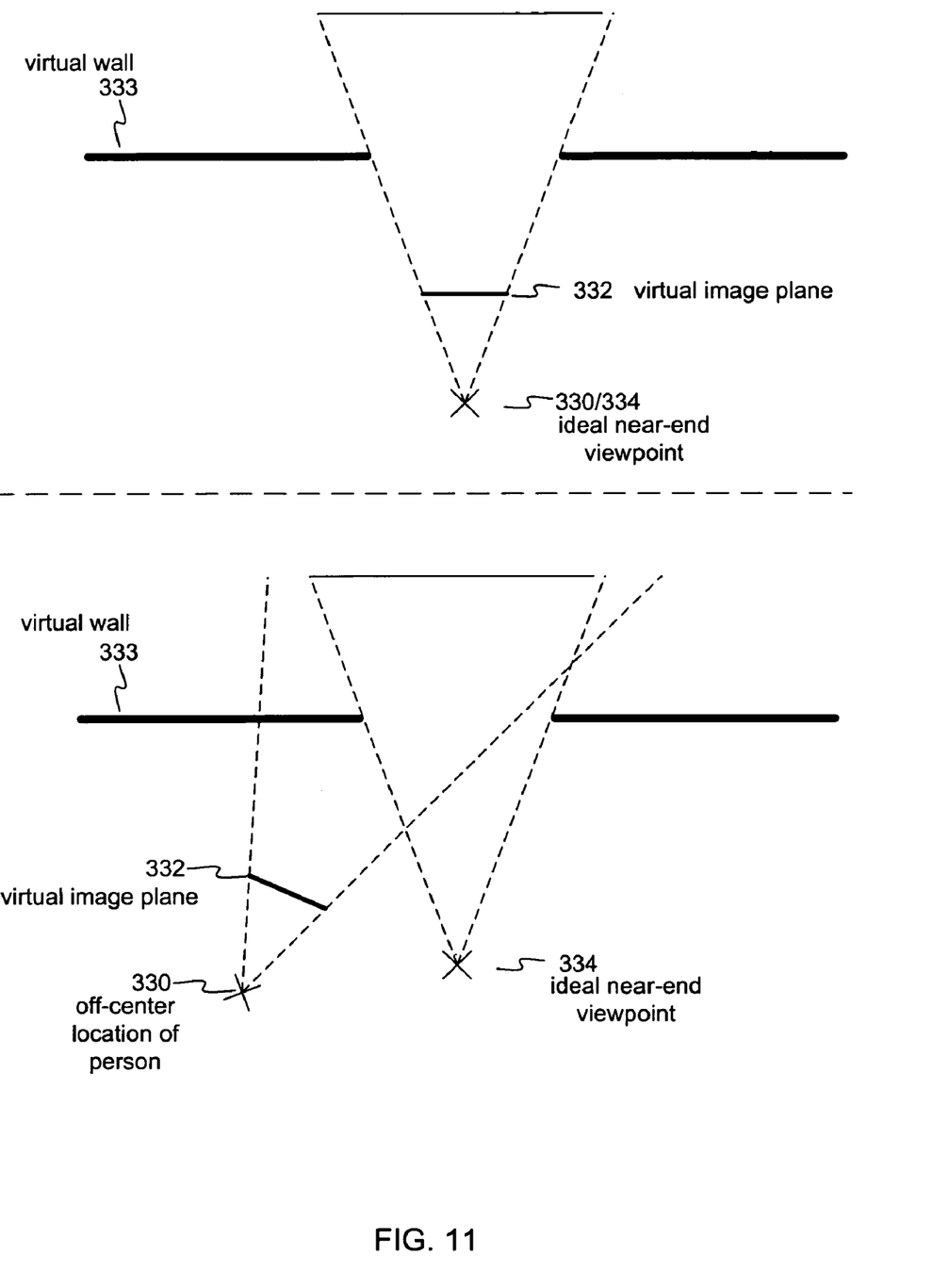
FIG. 11 shows another model that may be used for rendering far-end video.

FIG. 11 shows another projection model that may be used for rendering far-end video. This example also entails modeling a person's position as a viewpoint 330 (with a projection). A virtual plane 332 is the image plane representing the projection of the modeled surface from the viewpoint 330. The virtual plane 332 moves with the viewpoint 330 (and the near-end person), and whatever the virtual plane 332 "sees" (including possibly virtual wall 333) determines what is displayed on the near-end terminal. At an ideal viewpoint 334 (top of FIG. 11), the far-end video is fully displayed and/or centered. At an off-center viewing position (bottom of FIG. 11), the far-end video may be displayed as partially "cut-off", obstructed, etc. In some cases, this model may help the near-end person's eyes to move with the person.

CONCLUSION

The techniques described herein for rendering video are useful for videoconferencing, but may have other applications. For example, the techniques may be used for video gaming, or rendering pre-recorded video. That is to say, in place of the far-end video displayed as described above, any video being rendered may be visually positioned; the techniques are not sensitive to whether or not the rendered video is live/real-time. The rendered and displayed video need not be captured video but instead could be scenery modeled and rendered in real time, for example as in a video game. The techniques described herein may be implemented by a variety of videoconference terminals, including laptops or workstations configured with software and hardware to function as a videoconferencing terminal. Some of the steps may be performed by a processor that may or may not be considered to be a part of a videoconferencing terminal.

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be reliably and readily used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed.

The invention claimed is:

1. A method implemented by a near-end videoconferencing terminal for displaying far-end video on a display of the near-end videoconferencing terminal, the far-end video being provided by a far-end videoconferencing terminal connected with the near-end videoconferencing terminal, where a first person is using the near-end videoconferencing terminal to video conference with a second person using the far-end videoconferencing terminal, the method comprising:
automatically determining positions of the first person relative to the display of the near-end videoconferencing terminal as the first person moves;
according to the positions, transforming and displaying the far-end video by the display of the near-end videoconferencing terminal with a dynamically changing size and a concurrent dynamically changing location, where the dynamically changing size changes dynamically in proportion to both translation of the first person parallel to the display and translation of the first person perpendicular to the display, and where the dynamically changing location changes dynamically in proportion to translation of the first person parallel to the display.

2. A method according to claim 1, wherein the dynamically changing size and location are computed such that the far-end video is displayed to simulate a parallax effect that would occur if the first person, while moving, was looking at the far-end video through the display and the far-end video were in a fixed location opposite the display from the first person.

3. A method according to claim 2, wherein as the far-end video is displayed and the first person moves to the different positions, the far-end video appears to move to stay aligned between the first person and a modeled surface which is modeled as stationary relative to the view point.

4. A method according to claim 1, further comprising receiving near-end video of the near-end person from a camera included with the near-end video conferencing terminal, and the determining of the position of the first person is performed using the near-end video by analyzing the near-end video.

5. A method according to claim 4, wherein the determining and displaying are performed repeatedly, and as the near-end person moves further away from the center of the camera's field of view, a corresponding portion of the displayed far-end video is increasingly not displayed.

6. A method according to claim 1, wherein the far-end video is rendered and displayed as though projected from a plane and at least partly through an opening in a clipping surface between the plane and the near-end person, wherein if the near-end person is in a position that causes a portion of the projection of the far-end video from the plane to be partially occluded by the clipping surface, a corresponding edgeward portion of the near-end video is caused to be not displayed when displaying the near-end video.

7. A method according to claim 1, wherein the position of the first person is in three dimensions and is estimated by image analysis of near-end video captured by a camera of the near-end videoconferencing terminal to determine a size and location of image data of the near-end person in the near-end video.

8. A videoconferencing device comprising:
a video camera for providing video data to a remote videoconferencing device;
a display for displaying remote video data from the remote videoconferencing device; and
a processor and storage configured to display the remote video on the display by:
continuously obtaining location information indicating a changeable location of a person relative to the video camera or the video conferencing device, and
continuously rendering and displaying the remote video on the display by continuously computing a size and location for the remote video to correspond to a projection from an area behind the display to the location of the person such that as the person moves the size and location of the remote video correspond to changing size and location of the projection.

9. A videoconferencing device according to claim 8, wherein as the person moves away from video camera, the displayed remote video zooms out in response, and as the person moves closer to the video camera in response the displayed video zooms in.

10. A videoconferencing device according to claim 8, wherein as the person moves in a direction lateral to the video camera, the remote video is displayed to appear as though moving in the same direction.

11. A videoconferencing device according to claim 8, wherein the remote video is displayed as a window within a graphical frame, wherein portions of the window outside the frame are not displayed, and when the window and graphical frame move relative to each other on the display such that when there is a gap between an edge of the window and the graphical frame the gap is filled with graphical data other than the remote video.

12. A videoconferencing device according to claim 11, wherein the graphical frame corresponds to a virtual portal.

13. A videoconferencing device according to claim 8, wherein the processor determines the location of the person by: analyzing frames of video produced by the video camera; recognizing in a frame an area of image data representing the person; computing a size and location of the area in the video frame; and using the size and location of the area to compute the location of the person in three dimensions.

14. One or more computer-readable storage media, wherein the storage media is not a signal, the storage media storing information configured to transform a videoconferencing device to perform a process, the videoconferencing device comprising a display displaying remote video from a remote videoconferencing device, the video conferencing device providing to the remote videoconferencing device video captured by a camera of the videoconferencing device, the process comprising:

tracking a changing location of a person who is using the videoconferencing device;

computing a model of a three-dimensional scene, the model of the three-dimensional scene comprising a bounded first plane, a point having a location in the three-dimensional scene that changes in correspondence with the tracked changing location of the person, a second plane substantially parallel to the bounded first plane and arranged between the point and the bounded first plane, and a projection of the bounded first plane that changeably converges to the changing location of the point; and fitting the remote video to a graphical display area displayed on the display, where the graphical display area is determined by an intersection between the projection and the second plane, the graphical display area changing in accordance with changes in the intersection resulting from changes of the location of the point.

15. One or more computer-readable storage media according to claim 14, wherein the graphical display area is movably displayed in a bounded region of the display such that portions of the graphical display outside the bounded region are not displayed, and the portions of the area being displayed or not displayed change in accordance with changes in location of the person.

16. One or more computer-readable storage media according to claim 15, wherein when an edge of the graphical display area moves within the window, non-video is displayed in the changing area between the edge of the area and the edge of the window.

17. One or more computer-readable storage media according to claim 16, wherein the scene further comprises a bounded region fixed on the second plane and the intersection at least partly overlaps as it moves on the second plane in accordance with movement of the person and the point.

18. One or more computer-readable storage media according to claim 17, wherein the bounded region corresponds to the window and portions of the intersection outside the bounded region correspond to portions of the graphical display area outside the window.

19. One or more computer-readable storage media according to claim 14, wherein the second plane includes a rectangle fixed therein, and portions of the intersection outside the rectangle correspond to portions of the graphical display area that are not displayed.

* * * * *